(12) United States Patent
Vestrini et al.

(10) Patent No.: US 7,945,373 B2
(45) Date of Patent: May 17, 2011

(54) METHOD AND APPARATUS FOR CONTROLLING AN ENGINE CAPABLE OF OPERATING ON MORE THAN ONE TYPE OF FUEL

(75) Inventors: Andrew Vestrini, Wadhurst (GB); Anthony Peter Bell, Norwich (GB); Anthony James Peck, Wymondham (GB); Ralph Purvis, Hingham (GB)

(73) Assignee: AM General LLC, South Bend, IN (US)

( * ) Notice: Subject to any disclaimer, the term of this patent is extended or adjusted under 35 U.S.C. 154(b) by 506 days.

(21) Appl. No.: 12/221,701

(22) Filed: Aug. 6, 2008

(65) Prior Publication Data

US 2010/0036583 A1    Feb. 11, 2010

(51) Int. Cl.
 F02D 41/00    (2006.01)
 F02M 25/07    (2006.01)
(52) U.S. Cl. ....................................................... 701/103
(58) Field of Classification Search .......... 701/103–105; 123/672, 674, 695, 1 A; 73/114.38, 114.42
See application file for complete search history.

(56) References Cited

U.S. PATENT DOCUMENTS

| | | | |
|---|---|---|---|
| 4,459,845 A * | 7/1984 | Keilbach et al. ............ | 73/114.42 |
| 4,656,829 A * | 4/1987 | Creps et al. ..................... | 60/276 |
| 5,094,208 A | 3/1992 | Adam | |
| 5,163,407 A | 11/1992 | Yoshida | |
| 5,255,661 A | 10/1993 | Nankee | |
| 5,267,163 A | 11/1993 | Yoshida | |
| 5,850,824 A | 12/1998 | Seitz | |
| 5,881,703 A | 3/1999 | Nankee | |
| 5,970,968 A | 10/1999 | Davis | |
| 6,041,278 A | 3/2000 | Kennie | |
| 6,827,069 B1 | 12/2004 | Dudek et al. | |
| 2003/0187567 A1 | 10/2003 | Sulatisky et al. | |
| 2003/0221680 A1 | 12/2003 | Tonetti et al. | |
| 2004/0162667 A1 | 8/2004 | Abe et al. | |
| 2009/0031704 A1 | 2/2009 | Tanaka | |

FOREIGN PATENT DOCUMENTS

EP    1336745    8/2003

OTHER PUBLICATIONS

Int'l Search Report & Written Opinion issued Apr. 12, 2009, in App. No. PCT/US09/52351.

* cited by examiner

*Primary Examiner* — Hieu T Vo
(74) *Attorney, Agent, or Firm* — Barnes & Thornburg LLP

(57) ABSTRACT

A control system for an engine capable of operating on more than one type of fuel includes an engine control unit that determines a default fuel volume to be injected into the engine based on relevant engine parameters and characteristics of a default fuel type. A default mass fuel flow rate is derived from the default fuel volume and relevant engine parameters. The actual mass fuel flow rate into the engine is inferred from the mass air flow rate into the engine and the exhaust gas air-to-fuel ratio, which is determined using a wide range oxygen sensor. A fuel correction factor is calculated from the default mass fuel flow rate and the inferred mass fuel flow rate. The fuel correction factor is used to increment or decrement the default fuel volume in a subsequent fuel injection cycle thereby incrementing or decrementing the inferred mass fuel flow rate toward the default mass fuel flow rate.

10 Claims, 2 Drawing Sheets

METHOD AND APPARATUS FOR CONTROLLING AN ENGINE CAPABLE OF OPERATING ON MORE THAN ONE TYPE OF FUEL

BACKGROUND OF THE INVENTION

1. The Technical Field

The present invention is directed generally to a method and apparatus for controlling an engine capable of operating on more than one type of fuel. More particularly, the present invention is directed to a method and apparatus for optimizing the torque output of a compression ignition engine capable of operating on more than one type of fuel.

2. The Prior Art

Spark ignition engines capable of operating on gasoline, ethanol, and blends thereof are known in the art. Such engines are commonly referred to as flexible fuel (or flex fuel) engines. Some known control systems for these engines require selection of an engine control algorithm based on an anticipated fuel composition, for example, 100% gasoline or 15% gasoline and 85% ethanol (the latter of which is commonly referred to as E85). Other known control systems sense the composition of the fuel in the fuel tank and adjust the engine control algorithm accordingly. Yet other known control systems sense exhaust gas air-to-fuel ratio and adjust the amount of fuel being provided to the engine to bring the air/fuel mixture toward stoichiometric. Generally, the motivation behind these systems is to optimize the engine's emissions performance.

Compression ignition engines capable of operating on both diesel fuel and aviation kerosene (jet fuel) also are known in the art. Known control systems for such engines typically require the operator to manually select an engine control algorithm appropriate for either diesel fuel or jet fuel. One shortcoming of such prior art systems is that they require the operator to know or guess what fuel type is being supplied to the engine and manually adjust the engine control system accordingly. Another shortcoming of such prior art systems is that neither the diesel fuel algorithm nor the jet fuel algorithm may be particularly well-suited for controlling an engine being supplied with a blend of diesel and jet fuel or where the properties of the fuel being used are varying within their allowable specifications. Fuel blending is likely to occur any time fuel is added to a partially empty fuel tank through inattention, because the person filling the tank might not know what type of fuel is already in the tank, or because more of the type of fuel already in the tank is not available.

SUMMARY OF THE INVENTION

The present invention is directed to a method and system for optimizing the performance, and particularly the torque output, of a compression ignition engine capable of operating on more than one type of fuel, for example, diesel fuel and jet fuel or blends thereof, based on the composition of fuel being used in the engine at a given time. In a preferred embodiment, the present invention involves determining the engine's exhaust gas air-to-fuel ratio using a wide range oxygen sensor, determining the mass air flow rate into the engine, inferring the mass fuel flow rate into the engine based on the exhaust gas air-to-fuel ratio and the mass air flow rate, calculating the corresponding anticipated mass fuel flow rate into the engine based on a predetermined engine control algorithm, calculating a fuel correction factor based on the anticipated mass fuel flow rate and the inferred mass fuel flow rate, and altering the actual fuel flow rate to bring the inferred fuel flow rate toward the anticipated fuel flow rate. The mass air flow rate preferably is calculated based on intake manifold air pressure, intake manifold air temperature, engine speed, and relevant engine parameters. Measures can be provided to disable or suspend application of the fuel correction factor during non-steady state and/or transient engine operating conditions.

DETAILED DESCRIPTION OF A PREFERRED EMBODIMENT

Figure 1:
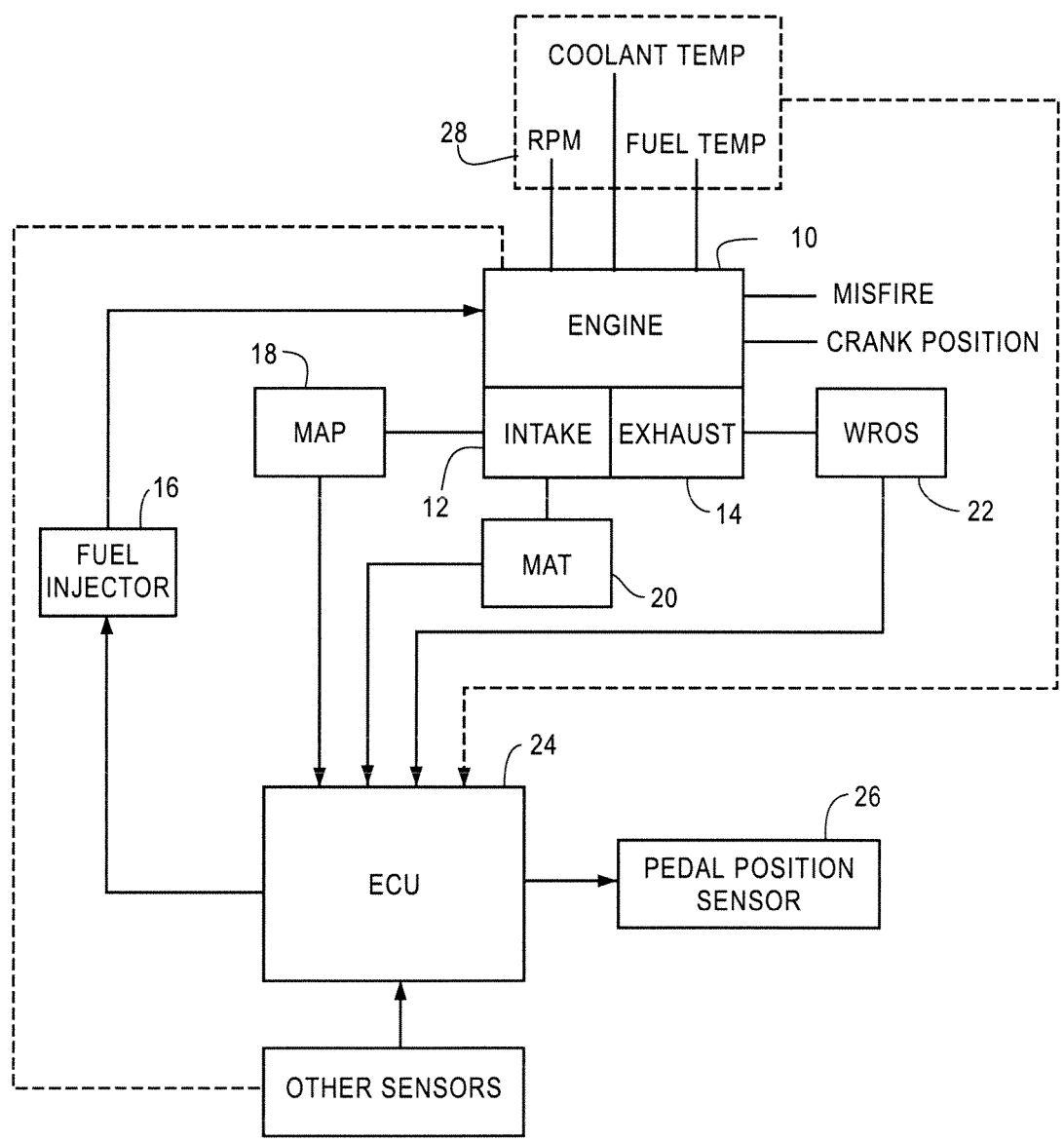
FIG. 1 is a schematic diagram of a compression ignition engine and control system therefor according to an embodiment of the present invention.

FIG. 1 illustrates schematically a compression ignition engine having a control system according to an embodiment of the present invention. Engine 10 includes intake manifold 12, exhaust system 14, and fuel injector(s) 16. Although only one fuel injector 16 is shown, one skilled in the art would recognize that engine 10 could have any number of combustion chambers and that at least one fuel injector would be provided for each such combustion chamber. Intake manifold 12 preferably is equipped with intake manifold air pressure sensor 18 and intake manifold air temperature sensor 20. Exhaust system 14 is equipped with wide range oxygen sensor (WROS) 22. Engine 10 is equipped with an engine speed (RPM) sensor 24 and preferably is equipped with a number of other sensors, as well, for sensing parameters such as fuel temperature and coolant temperature. Engine 10 also can be equipped with sensors for detecting cylinder misfires, crank position, and/or other parameters.

Engine control unit (ECU) 24 controls the flow of fuel to engine 10 using an engine control algorithm based on relevant characteristics of engine 10 (that could include, for example, engine displacement and number of cylinders), relevant characteristics (that could include, for example, density and energy content) of a default fuel type (that could include, for example, diesel fuel, aviation kerosene, biodiesel fuel, and any other fuel that could be used in a compression ignition engine), and relevant engine operating parameters (that could include, for example, engine speed (rpm) and accelerator pedal position), as would be understood by one skilled in the art. ECU 24 is further programmed to increment or decrement the fuel volume to be delivered to the engine from the volume determined by the engine control algorithm for the default fuel based on a fuel correction factor derived as discussed further below. ECU 24 can receive inputs from engine speed sensor 28, accelerator pedal position sensor 26, and WROS 22 and use information derived therefrom to determine default fuel flow and the fuel correction factor. ECU 24 also can receive inputs from intake manifold air pressure sensor 18, intake manifold air temperature sensor 20, any or all of the other sensors discussed above, and/or additional sensors and use the information derived therefrom in the foregoing fueling determinations. ECU 24 provides an output to fuel injector 16 that causes a predetermined volume of fuel to be injected into the engine. Alternatively, ECU 24 can provide an output to an intermediate control system that provides an output to fuel injector 16, thereby causing fuel injector 16 to inject a predetermined volume of fuel into the engine.

Figure 2:
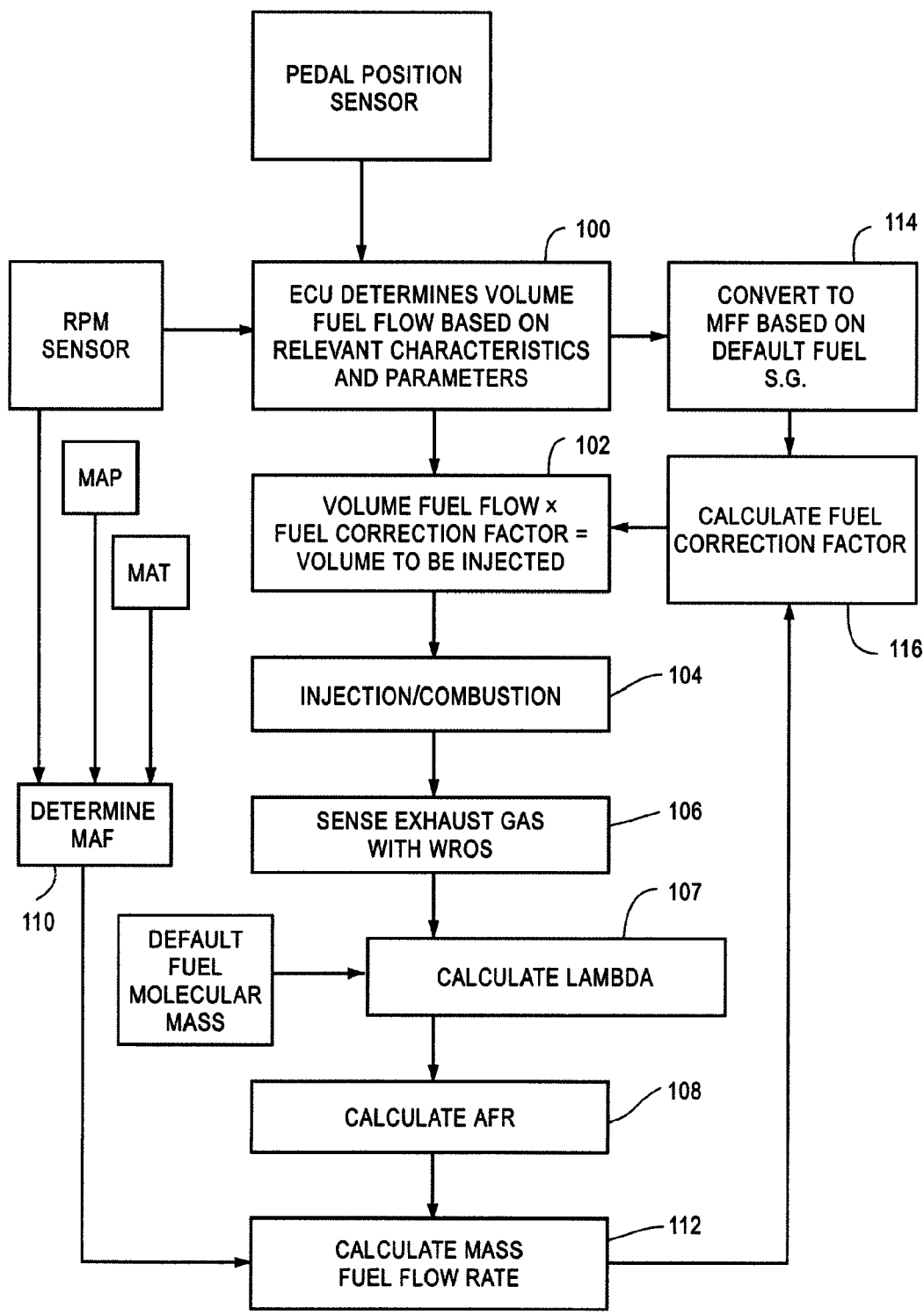
FIG. 2 is a process diagram of a method for controlling a compression ignition engine according to an embodiment of the present invention.

FIG. 2 is a process diagram showing a preferred embodiment of the method of the present invention. In step 100, the ECU determines a default volume of fuel to be injected into the engine based on relevant engine operating parameters that can include engine rpm, accelerator pedal position, and relevant characteristics (for example, energy content and density) of the default fuel type (for example, diesel fuel), as would be understood by one skilled in the art. In step 102, the default fuel volume from step 100 can be multiplied by a fuel correction factor determined as discussed below. Under certain conditions, for example, start up, non-steady state, and/or transient conditions, the fuel correction factor can be set at a default value, for example, 1, and/or the calculation in step 102 can be disabled or suspended.

In step 104, fuel is injected into and combusted in the engine. In step 106, the engine's exhaust gas is sampled using a WROS. In step 107, the exhaust gas percent oxygen concentration from step 106 is used to calculate a lambda value (a dimensionless value related to stoichiometric combustion of the fuel being used in the engine), as would be understood by one skilled in the art. In step 108, under normal, steady state operating conditions, the exhaust gas air-to-fuel ratio can be calculated based on the lambda value from step 107 and the default fuel's molecular mass, as would be understood by one skilled in the art. Under non-steady state conditions or as otherwise deemed preferable, the exhaust gas air-to-fuel ratio can instead be calculated based on an earlier obtained and stored WROS output or a predetermined default value. For example, a default value might be used when starting the engine.

In step 110, the mass air flow rate into the engine is determined. In a preferred embodiment, under normal, steady state operating conditions, the mass air flow rate is calculated based on engine rpm, intake manifold air pressure, intake manifold air temperature, and engine displacement, as would be understood by one skilled in the art. Under non-steady state conditions or as otherwise deemed preferable, the mass air flow rate can be calculated instead based on an earlier obtained and stored intake manifold air pressure value or a predetermined default value. For example, a default value might be used when starting the engine. In an alternate embodiment, the mass air flow rate could be determined by other means, for example, using a mass air flow sensor.

In step 112, an inferred mass fuel flow rate is calculated based on the air-to-fuel ratio from step 108 and the mass air flow rate from step 110, as would be understood by one skilled in the art.

In step 114, the default fuel volume from step 100, relevant engine operating parameters (for example, engine speed and number of cylinders), and the density of the default fuel type are used as bases for determining the default mass fuel flow rate corresponding to the default fuel volume at those operating conditions, as would be understood by one skilled in the art. At step 116, a fuel correction factor is calculated by dividing the default mass fuel flow rate from step 114 by the inferred mass fuel rate from step 112.

If the fuel being burned in the engine is the same as, or has the same relevant characteristics as, the default fuel used as a basis for the engine control algorithm, then, under steady state conditions, the inferred mass fuel flow rate should be substantially the same as the default mass fuel flow rate. Accordingly, the fuel correction factor should be about 1.

If the fuel being burned in the engine has a lower density than the default fuel (a condition indicative of the fuel having a lower energy content than the default fuel), then the inferred mass fuel flow rate would be expected to be lower than the default fuel mass flow rate because the volume of fuel injected would have a lower mass than a like volume of default fuel that the engine control algorithm indicated should have been injected. Accordingly, the fuel correction factor would be expected to be greater than 1. As such, in the next fuel injection cycle, the default fuel volume determined by the engine control algorithm would be multiplied by the fuel correction factor, thereby incrementing the actual mass fuel flow rate toward the default mass fuel flow rate.

Conversely, if the engine were operating on a fuel having a density greater than the default fuel (a condition indicative of the fuel having a higher energy content than the default fuel), then the inferred mass fuel flow rate would be expected to be greater than the default fuel mass flow rate because the volume of fuel injected would have a greater mass than a like volume of default fuel that the engine control algorithm indicated should have been injected. Accordingly, the fuel correction factor would be expected to be less than 1. As such, in the next fuel injection cycle, the default fuel volume determined by the engine control algorithm would be multiplied by the fuel correction factor, thereby decrementing the actual mass fuel flow toward the default mass fuel flow rate.

Preferably, the fuel selected as the default fuel in establishing the default engine control algorithm has a relatively high density (which is indicative of relatively high energy content) compared to the density of other fuels expected to be used in the engine. If a fuel with a relatively high density is chosen as the default fuel and the engine is run instead on a suitable fuel having a relatively low density (indicative of a relatively low energy content), then the engine would be expected to produce less power per unit volume of fuel actually used than it would using a like volume of the default fuel because of the lower energy content of the actual fuel. The actual fuel flow could be incremented according to the present invention to optimize the engine's power output.

Conversely, if a fuel having a relatively low density (indicative of a relatively low energy content) were selected as the default fuel and the engine were run instead on a suitable fuel having a relatively high density (indicative of a relatively high energy content), then the engine would be expected to produce more power per unit volume of fuel actually used than it would using a like volume of the default fuel because of the greater energy content of the actual fuel. The actual fuel flow could be decremented according to the present invention to reduce the engine's power output toward the output that would be expected using the default fuel. In the meantime, however, the greater power output could exceed the engine's structural limits and damage it.

Under certain engine operating conditions, it might be preferable to use default data in lieu of sensor data or to use stored, historical sensor data in lieu of real time sensor data at, for example, steps 108 and 110. For example, upon engine start up, it might be desirable to use predetermined default values instead of real time data from the WROS and/or intake manifold air pressure sensor in calculating air-to-fuel ratio and mass air flow. Under such conditions, the air-to-fuel ratio calculation at step 108 and/or mass air flow calculation at step 110 could be conducted using default data, for example, default data stored in the ECU's memory. As another example, it might be desirable after engine start-up but before steady state operating conditions have been reached, to use historical WROS and intake manifold air pressure sensor data instead of real time data from those sensors or default data. The historical sensor data could be stored in the ECU.

A number of factors could be deemed relevant in determining whether steady state conditions have been reached. In a preferred embodiment, fuel temperature, engine coolant temperature, intake manifold air temperature, engine speed, and fuel injection quantity from step 100 are compared to threshold values, and the engine is deemed to be in steady state if all of the foregoing parameters are at values equal to or above the threshold values. In other embodiments, more, fewer, and/or different parameters and thresholds could be used as a basis for determining whether the engine is operating under steady state conditions.

Under certain operating conditions, it might be preferable to use a stored, historical fuel correction factor in the calculation at step 102, rather than using a real time fuel correction factor. For example, it might be desirable to use a stored, historical fuel correction factor in the step 102 calculation when the engine is not operating under steady state conditions, as discussed above. It also might be desirable to use a stored, historical fuel correction factor in the step 102 calculation when the engine is operating under certain transient conditions, for example, conditions where one or more of the WROS, intake manifold air pressure sensor, and engine speed sensor outputs are changing rapidly and/or the default fuel injection quantity indicated by the ECU is changing rapidly.

The sensor output signals discussed above can be filtered and/or buffered to better provide useful data for the calculations relying on those signals or information derived from them, as would be understood by one skilled in the art.

The fuel correction factor also can be filtered and/or buffered prior to its use in the step 102 calculation, as would be understood by one skilled in the art. For example, it may be desirable to filter an oscillating fuel correction factor to stabilize it prior to applying it at step 102.

Further, the fuel correction factor can be validated prior to its use in the step 102 calculation. For example, the fuel correction factor determined at step 116 could undergo a rationality check prior to use to ensure that it lies within a rational range. In an embodiment where the default fuel is one of diesel fuel and aviation kerosene and the fuel actually being used in the engine is the other of diesel fuel and aviation kerosene, the fuel correction factor typically would be expected to be between about 0.8 and 1.08. A fuel correction factor determined at step 116 falling outside this range may be indicative of bad data, for example, erroneous sensor data, having been used in one of the earlier calculations on which the step 116 calculation is based. In this situation, the fuel correction factor calculated could be limited to a corresponding predetermined upper or lower limit. Alternatively, the fuel correction calculation at step 102 could be suspended or performed using a historical fuel correction factor until a rational, real time fuel correction factor is next calculated. Such a historical fuel correction factor could be stored in the ECU.

Also, the fuel correction calculation at step 102 could be suspended or a historical fuel correction factor could be used in the calculation if an engine diagnostic system indicates a condition under which application of a new fuel correction factor would be inappropriate. For example, if an engine diagnostic system detects a cylinder misfire, it might be desirable to suspend the fuel correction function or to use a historical fuel correction factor in the step 102 calculation until the condition causing the misfire has been corrected. Other diagnostic conditions that might indicate that the fuel correction calculation should be suspended or performed using historical data could include crank position, intake manifold air pressure, intake manifold air pressure, fuel temperature, coolant temperature, and/or WROS output outside of corresponding predetermined ranges. Such conditions could indicate problems with the engine, the sensors, or both, such that it might be inappropriate to apply a real time fuel correction factor in the step 102 calculation.

The embodiments described herein are exemplary and are not intended to limit the scope of the invention which is defined by the following claims.

The invention claimed is:

1. A method of controlling of an engine adapted to operate on more than one fuel, comprising the steps of:
   determining an anticipated fuel flow rate based on a first fuel type;
   determining an exhaust gas air-to-fuel ratio of said engine using a wide range oxygen sensor;
   determining a mass air flow rate into said engine;
   calculating a mass fuel flow rate into said engine based on said exhaust gas air-to-fuel ratio and said mass air flow rate;
   calculating a fuel correction factor by dividing said anticipated fuel flow rate by said calculated mass fuel flow rate; and
   altering the fuel flow rate into said engine based on said fuel correction factor.

2. The method of claim 1 wherein said step of determining a mass air flow rate into said engine comprises calculating said mass air flow rate based on information obtained further to:
   sensing intake manifold air pressure of said engine;
   sensing engine speed of said engine; and
   sensing intake manifold air temperature of said engine.

3. The method of claim 1 further comprising the step of determining whether said engine is operating under steady state conditions.

4. The method of claim 3 further comprising the step of using real time sensor data when said engine is operating under steady state conditions.

5. The method of claim 3 further comprising the step of using historical sensor data when said engine is not operating under steady state conditions.

6. The method of claim 1 further comprising the step of determining whether said engine is operating under transient conditions.

7. The method of claim 6 further comprising the step of using real time sensor data when said engine is operating under transient conditions.

8. The method of claim 6 further comprising the step of using historical sensor data when said engine is not operating under transient conditions.

9. The method of claim 1 wherein a first of said fuels is one of diesel fuel and aviation kerosene.

10. The method of claim 1 wherein a second of said fuels is the other one of diesel fuel and aviation kerosene.

* * * * *